(12) United States Patent
Xie

(10) Patent No.: US 11,719,814 B2
(45) Date of Patent: *Aug. 8, 2023

(54) SYSTEM AND METHOD FOR MOBILE PLATFORM OPERATION

(71) Applicant: SZ DJI TECHNOLOGY CO., LTD., Shenzhen (CN)

(72) Inventor: Jiebin Xie, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 253 days.

This patent is subject to a terminal disclaimer.

(21) Appl. No.: 17/153,176

(22) Filed: Jan. 20, 2021

(65) Prior Publication Data

US 2021/0141088 A1  May 13, 2021

Related U.S. Application Data

(63) Continuation of application No. 16/003,276, filed on Jun. 8, 2018, now Pat. No. 10,901,085, which is a
(Continued)

(51) Int. Cl.
*G01S 15/93* (2020.01)
*G01S 15/08* (2006.01)
(Continued)

(52) U.S. Cl.
CPC ............ *G01S 15/93* (2013.01); *G01C 21/183* (2020.08); *G01S 15/08* (2013.01); *G01S 15/66* (2013.01);
(Continued)

(58) Field of Classification Search
CPC .......... G01S 15/93; G01S 15/08; G01S 15/66; G01S 19/01; G08G 5/04; G08G 9/02;
(Continued)

(56) References Cited

U.S. PATENT DOCUMENTS 6,031,490 A * 2/2000 Forssen ................. H04W 64/00
455/456.5
7,136,016 B1 * 11/2006 Swensen .............. G08G 5/0043
342/455
(Continued)

FOREIGN PATENT DOCUMENTS

CN      101020453 A     8/2007
CN      101104403 A     1/2008
(Continued)

OTHER PUBLICATIONS

The World Intellectual Property Organization (WIPO) International Search Report and Written Opinion for PCT/CN2015/097066 dated Aug. 30, 2016 6 Pages.

*Primary Examiner* — Gertrude Arthur Jeanglaude
(74) *Attorney, Agent, or Firm* — Anova Law Group, PLLC

(57) ABSTRACT

A method of controlling a mobile platform includes measuring a distance between the mobile platform and an object when the mobile platform is located at each of a plurality of positions to obtain a plurality of measured distances each being obtained at one of the plurality of positions. Location information of the plurality of positions of the mobile platform is obtained by an inertial measurement unit (IMU) on the mobile platform. The at least two distance sensors being configured to capture data from different directions. The method further includes determining a position of the object based on the plurality of measured distances and the location information and controlling the mobile platform to avoid the object based on the results of the determined position of the object.

20 Claims, 10 Drawing Sheets

Related U.S. Application Data continuation of application No. PCT/CN2015/097066, filed on Dec. 10, 2015.

(51) Int. Cl.

| | |
|---|---|
| *G01S 15/66* | (2006.01) |
| *G01C 21/16* | (2006.01) |
| *G08G 5/04* | (2006.01) |
| *G08G 9/02* | (2006.01) |
| *B64C 39/02* | (2023.01) |
| *G01S 19/01* | (2010.01) |
| *G05D 1/10* | (2006.01) |

(52) U.S. Cl.
CPC ............... *G08G 5/04* (2013.01); *G08G 9/02* (2013.01); *B64C 39/024* (2013.01); *B64U 2201/10* (2023.01); *G01S 19/01* (2013.01); *G05D 1/102* (2013.01)

(58) Field of Classification Search
CPC . B64C 39/024; B64C 2201/141; G01C 21/16; G05D 1/102
See application file for complete search history.

(56) References Cited

U.S. PATENT DOCUMENTS

| | | | |
|---|---|---|---|
| 7,312,752 B2* | 12/2007 | Smith | H04W 4/33 342/464 |
| 2005/0285878 A1* | 12/2005 | Singh | H04M 1/72427 345/633 |
| 2008/0002025 A1 | 1/2008 | Kakinami | |
| 2008/0243378 A1 | 10/2008 | Zavoli | |
| 2011/0288714 A1 | 11/2011 | Flohr et al. | |
| 2013/0325311 A1 | 12/2013 | Yoo et al. | |
| 2015/0106767 A1 | 4/2015 | Abercrombie et al. | |

FOREIGN PATENT DOCUMENTS

| | | |
|---|---|---|
| CN | 203133282 U | 8/2013 |
| CN | 103543751 A | 1/2014 |
| CN | 104298342 A | 1/2015 |

* cited by examiner

SYSTEM AND METHOD FOR MOBILE PLATFORM OPERATION

CROSS-REFERENCE TO RELATED APPLICATIONS

This application is a continuation of U.S. application Ser. No. 16/003,276, filed on Jun. 8, 2018, which is a continuation of International Application No. PCT/CN2015/097066, filed on Dec. 10, 2015, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile platform operations and more particularly, but not exclusively, to controlling a mobile platform during operation.

BACKGROUND

Autonomous or self-guided obstacle detection and avoidance is an important feature of mobile platforms. Many existing techniques for obstacle detection have drawbacks in functionality and cost. Some techniques can detect distance information without detecting directional information. For example, ultrasound is relatively inexpensively and can be used in outdoor imaging applications since ambient light does not interfere with ultrasound sensing. However, single-element ultrasound sensors, which transmit and detect ultrasound signals using a single ultrasound transducer, can detect distance but not direction. Although arrayed ultrasound technology can be used to retrieve some directional information, the high cost of arrayed ultrasound sensors can be prohibitive for many applications.

In view of the foregoing, there is a need for systems and methods for mobile platform obstacle detection that overcome the problem of lack of directional information.

SUMMARY

In accordance with a first aspect disclosed herein, there is set forth a method for controlling a mobile platform, comprising:
  measuring a distance between the mobile platform and an object at each of a plurality of positions of the mobile platform; and
  determining a position of the object based on the measuring.

In accordance with another aspect disclosed herein, there is set forth a system for controlling a mobile platform, comprising:
  one or more detectors configured to measure a distance between the mobile platform and an object at each of a plurality of positions of the mobile platform; and
  one or more processors configured to determine the position of the object based on the measured distances.

In accordance with another aspect disclosed herein, there is set forth a mobile platform, comprising:
  one or more detectors configured to measure a distance between the mobile platform and an object at each of a plurality of positions of the mobile platform; and
  one or more processors configured to determine the position of the object based on the measured distances.

In accordance with another aspect disclosed herein, there is set forth a computer readable storage medium, comprising:
  instruction for measuring a distance between the mobile platform and an object at each of a plurality of positions of the mobile platform; and
  instruction for determining a position of the object based on the measured distances.

Figure 1:
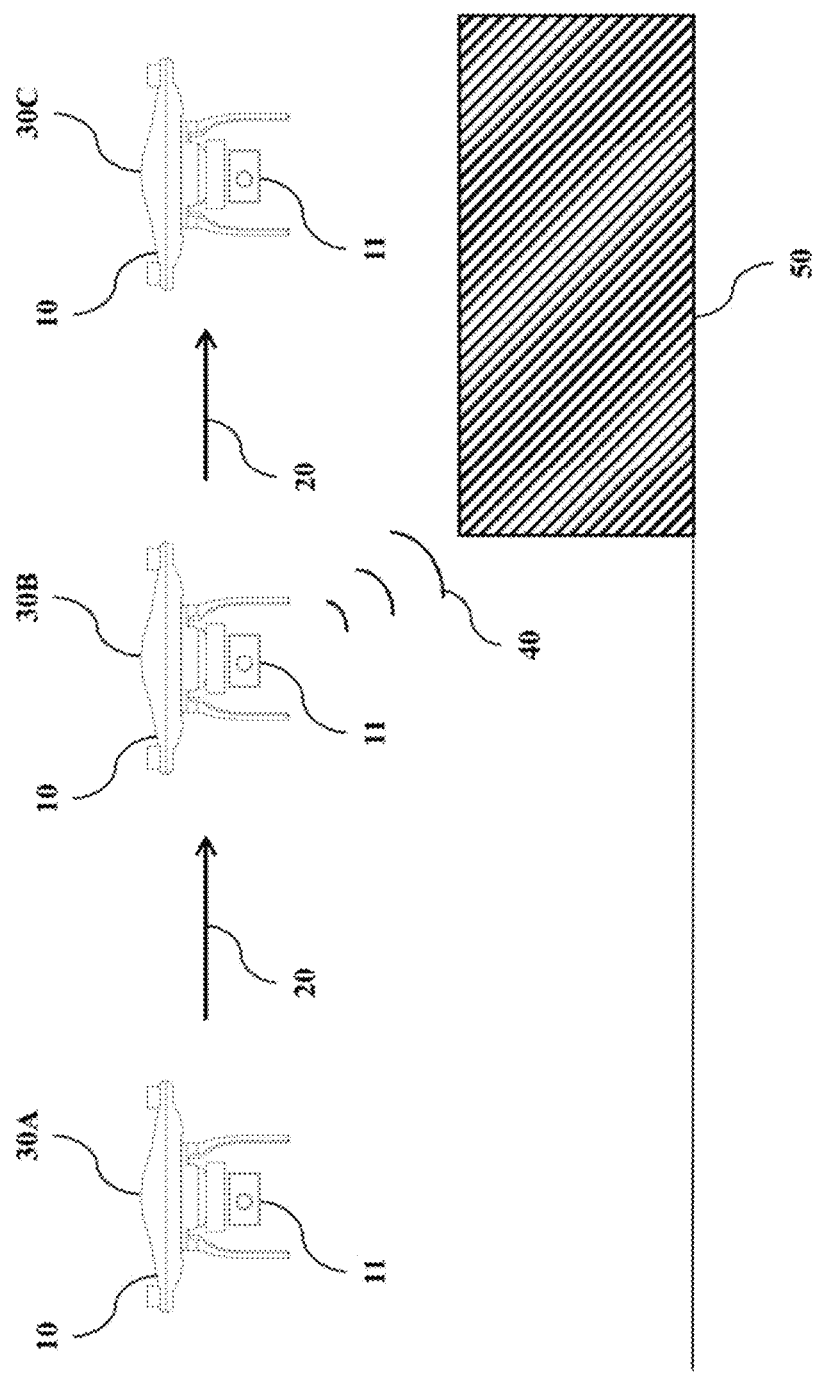
FIG. 1 is an exemplary diagram illustrating an embodiment of a mobile platform that is moving along a trajectory in relation to an object in an environment of the mobile platform.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

The present disclosure sets forth systems and for controlling mobile platforms that enable obtaining directional information about objects in an environment of the mobile platform, overcoming disadvantages of existing techniques.

Turning now to FIG. 1, an exemplary mobile platform 10 is shown as moving along a trajectory 20 (as illustrated by arrows). Mobile platforms 10 that are suitable for the present systems and methods include, but are not limited to, bicycles, automobiles, trucks, ships, boats, trains, helicopters, aircraft, various hybrids thereof, and the like. In some embodiments, the mobile platform 10 is an unmanned aerial vehicle (UAV). UAVs, colloquially referred to as "drones", are aircraft without a human pilot onboard the vehicle whose flight is controlled autonomously or by a remote pilot (or sometimes both). UAVs are now finding increased usage in civilian applications involving various aerial operations, such as data-gathering or delivery. The present systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs. Although the mobile platform 10 is shown in FIG. 1 as a UAV for illustrative purposes only, any mobile platform 10 can be used with the present systems and methods.

The exemplary mobile platform 10 is shown in FIG. 1 as including a sensor 11. Although shown with a single sensor 11 for illustrative purposes only, the mobile platform 10 can include any number of sensors 11, as desired—for example, 1, 2, 3, 4, 5, 6, or even a greater number of sensors 11. The sensors 11 can be arranged in any desired manner on the mobile platform 10, with the specific arrangement of sensors 11 depending on the imaging application. The sensors 11 can advantageously be lightweight and capable of high-frequency data collection so as to facilitate real-time obstacle detection and avoidance. Exemplary sensors 11 suitable for use in the mobile platform 10 include, but are not limited to, time-of-flight sensors, laser sensors, ultrasound sensors, color or monochrome sensors, electro-optical sensors, thermal/infrared sensors, multi-spectral imaging sensors, spectrophotometers, spectrometers, thermometers, illuminometers, microphones, and others.

In FIG. 1, the mobile platform 10 is shown at three representative positions 30A, 30B, and 30C along the trajectory 20 of the mobile platform 10. The sensor 11 can emit signals 40 (shown with respect to a central position 30B of the mobile platform 10) that enable detection of objects 50 in an environment of the mobile platform 10. Specifically, the signals 40 emitted from the sensor 11 can travel to an object 50, reflect off of the object 50, and return to the mobile platform 10. Detection of the reflected signals 40 can indicate a distance of the mobile platform 10 from the object 50. However, the signals 40 can be sent in all directions from the mobile platform 10. The signals 40, in other words, can be sent isotropically from the mobile platform 10. Accordingly, the direction from which the signals 40 are received is unknown, and hence directional information is not obtained. The lack of directional information is problematic for controlling the mobile platform 10. For example, the mobile platform 10 at the center position 30B can sense through the signals 40 that the object 50 is nearby. Yet, without information about the direction of the object 50 relative to the mobile platform 10, whether the trajectory 20 should be altered to avoid collision cannot be determined.

The problem of lack of directional information is addressed by the present systems and methods.

Figure 2:
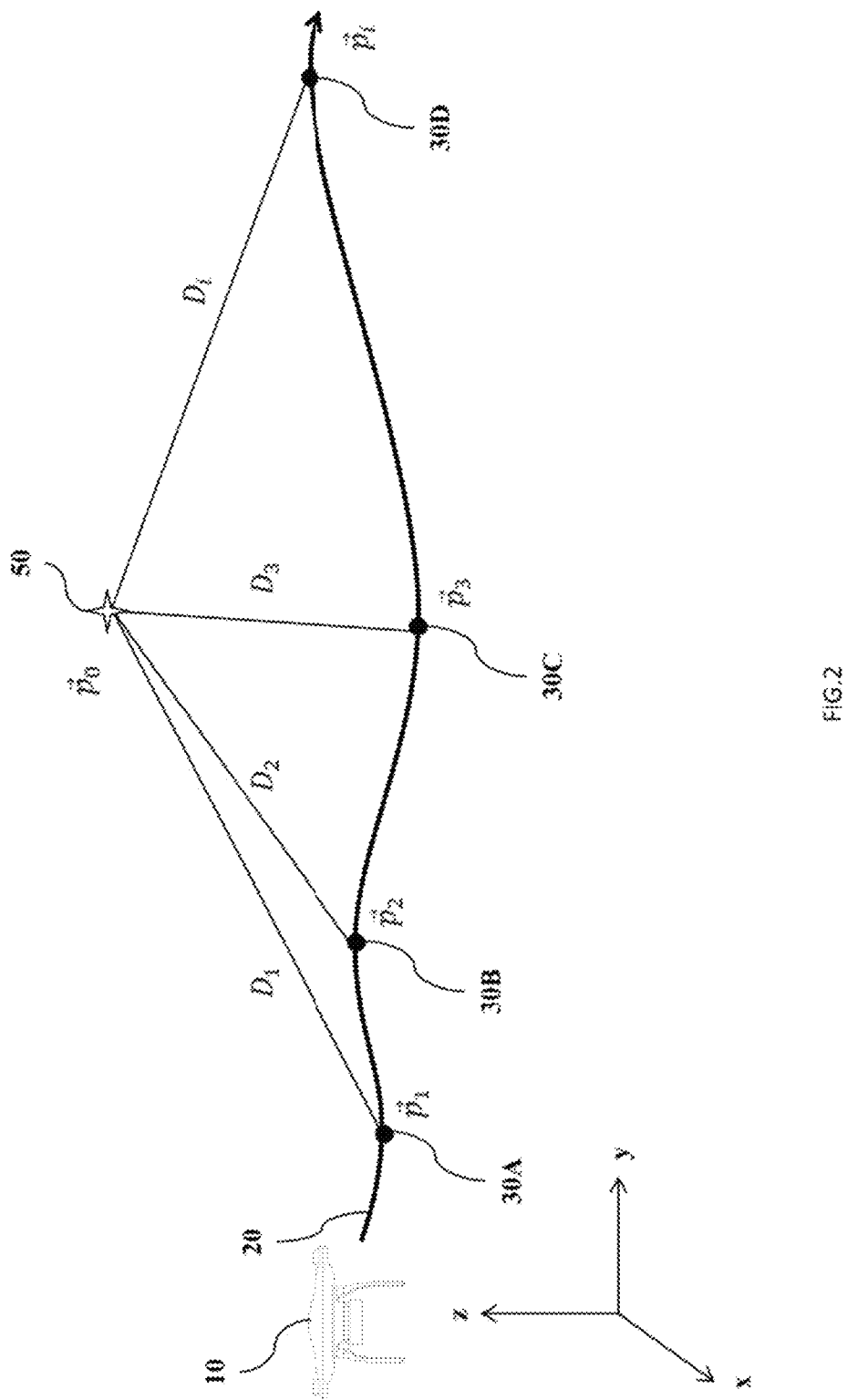
FIG. 2 is another exemplary diagram illustrating positions of the mobile platform of FIG. 1 while moving along the trajectory, as well as distances between the positions and the object as the mobile platform moves.

Turning now to FIG. 2, an exemplary trajectory 20 of a mobile platform 10 is shown to illustrate the present methods and systems for obtaining directional information about an object 20. The trajectory 20 can include a plurality of positions 30 (shown as individual positions 30A, 30B, 30C, 30D), of the mobile platform 10. The positions 30 have respective coordinates $\vec{p}_1, \vec{p}_2, \vec{p}_2, \ldots, \vec{p}_i$, wherein i is an index over the positions 30 of the mobile platform 10. The coordinates $\vec{p}_i$ can have numerical values that are based on a coordinate system in which the coordinates $\vec{p}_i$ are expressed. For example, the coordinates $\vec{p}_i$ can be expressed in a Cartesian coordinate system as an ordered triplet $(x_i, y_i, z_i)$ corresponding to the x-coordinate, y-coordinate, and z-coordinate of the position 30 of the mobile platform 10. Other coordinate systems (for example, cylindrical or spherical coordinate systems) can be used as desired in the present methods and systems without any loss of generality.

In some embodiments, the coordinates $\vec{p}_o$ and $\vec{p}_i$ can be global coordinates (for example, absolute coordinates as provided by a global positioning system). In some embodiments, the coordinates $\vec{p}_o$ and $\vec{p}_i$ can be relative coordinates (for example, coordinates relative to an initial position of the mobile platform 10).

An object 50 is shown in FIG. 2 as having coordinates $\vec{p}_o$—for example, Cartesian coordinates $(x_0, y_0, z_0)$. The object 50 has a distance $d_i$ with respect to each position 30 of the mobile platform 10. Each distance $d_i$ is well-defined given the coordinates $\vec{p}_o$ of the object 50 and the coordinates $\vec{p}_i$ of the position 30 of the mobile platform 10. For example, distance $d_i$ can be determined according to a distance formula, as shown in Equation (1) below:

$$d_i = \sqrt{(x_i-x_0)^2+(y_i-y_0)^2+(z_i-z_0)^2} \qquad \text{Equation (1)}$$

Stated somewhat differently, each distance $d_i$ is a function of the corresponding coordinates $\vec{p}_i$ of the mobile platform 10 and the coordinates $\vec{p}_o$ of the object 50. In some embodiments, the coordinates $\vec{p}_i$ and the corresponding distances $d_i$ can be obtained at various positions 30. The unknown coordinates $\vec{p}_o$ of the object 50 are three independent variables (for example, the variables $x_0, y_0, z_0$ in Cartesian coordinates) that can be estimated based on the known quantities $(x_i, y_i, z_i)$ and $d_i$ at positions 30. The estimation can be performed, for example, by solving a system of linear equations with the three variables $x_0, y_0, z_0$, wherein the number of equations N is the number of positions 30 of the mobile platform 10. In some embodiments, distances $d_i$ can be measured at three positions 30 of the mobile platform to determine the coordinates $\vec{p}_o$ of the object 50. In some embodiments, distances $d_i$ can be measured at more than three positions 30 of the mobile platform 10 to determine the coordinates $\vec{p}_o$ of the object 50.

In some embodiments, one or more distances $d_i$ measured at certain positions 30 of the mobile platform 10 can be excluded when estimating the position of the object 50. For example, distances $d_i$ measured at certain positions 30 can produce degenerate solutions of the coordinates $\vec{p}_o$ of the object 50 and therefore do not increase accuracy. Distance measurements taken at positions 30 that produce degenerate solutions can be excluded. In some embodiments, to improve accuracy, non-collinear positions 30 of the mobile platform 10 can be used to estimate the position of the object 50.

Figure 3:
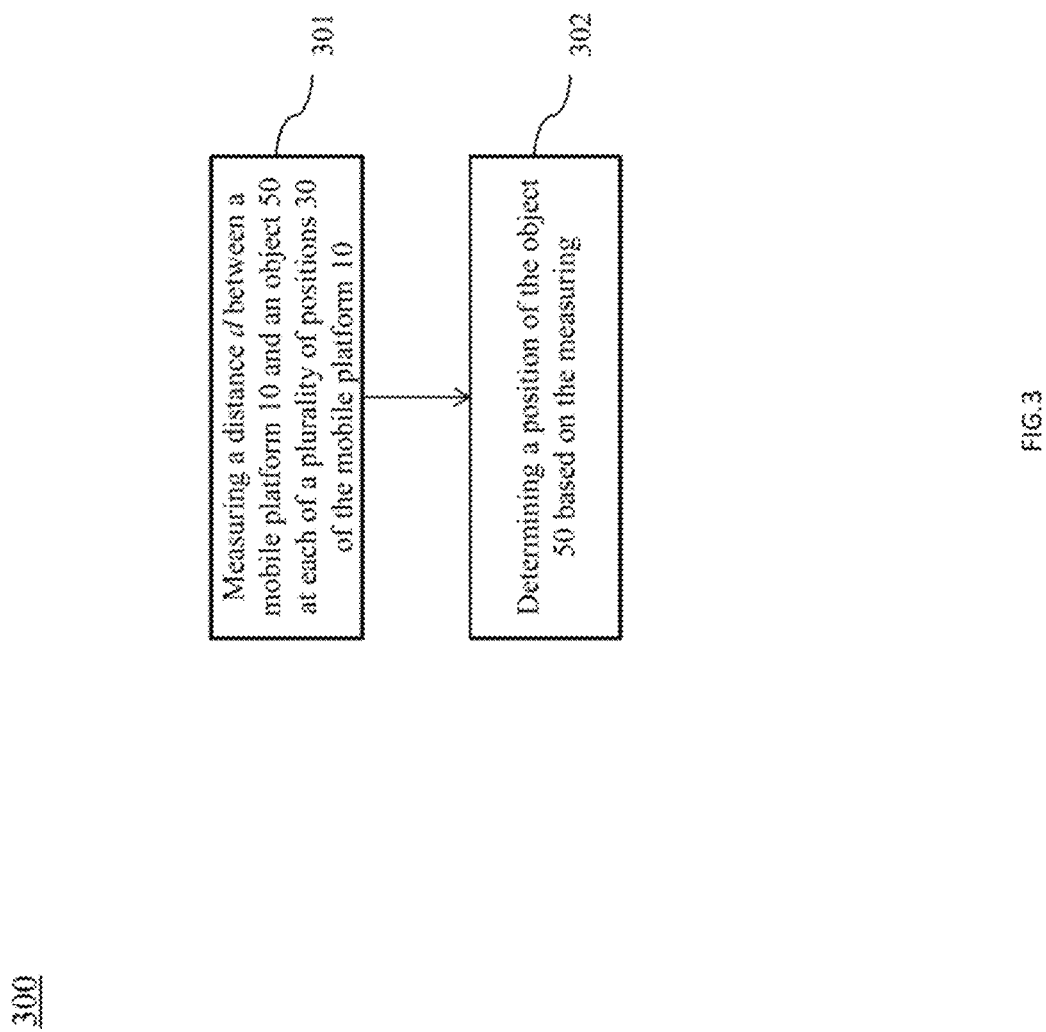
FIG. 3 is an exemplary top level flow chart illustrating an embodiment of a method for controlling the mobile platform of FIG. 1.

Turning now to FIG. 3, an exemplary method 300 is shown for controlling a mobile platform 10 based on distance information between the mobile platform 10 and the object 50. At 301, a distance $d_i$ is measured between the mobile platform 10 and the object 50 at each of a plurality of positions 30 of the mobile platform 10. The distance $d_i$ can be measured using one or more sensors 11 (shown in FIG. 1) situated aboard the mobile platform 10. The distance measurements can be made at any desired interval, depending on, for example, the type of mobile platform 10, the movement rate of the mobile platform 10, the expected density of objects 50 in the environment of the mobile platform 10, and/or other considerations. In some embodiments, the distance measurements can be made periodically. Exemplary frequencies of measurement can be from 1 to 2 milliseconds, 2 to 5 milliseconds, 5 to 10 milliseconds, 10 to 20 milliseconds, 20 to 50 milliseconds, 50 to 100 milliseconds, 100 to 200 milliseconds, 200 to 500 milliseconds, 500 milliseconds to 1 second, 1 to 2 seconds, 2 to 5 seconds, 5 to 10 seconds, 10 to 20 seconds, 20 to 50 seconds, 50 to 100 seconds, or more. In other embodiments, the distance measurements can be made irregularly, and/or at random intervals.

At 302, a position of the object 50 is determined based on the measuring of the distances $d_i$, at 301. The unknown coordinates $\vec{p}_o$ of the object 50 can be determined based on the distances $d_i$ measured at each of the positions 30 of the mobile platform 10. In some embodiments, the coordinates $\vec{p}_o$ of the object 50 can be determined based on the positions 30 of the mobile platform 10 and the measured distances $d_i$. The coordinates $\vec{p}_i$ of each position 30 of the mobile platform 10 can be obtained using any suitable manner. In some embodiments, the coordinates $\vec{p}_i$ of each position 30 can be obtained using a global positioning system (GPS), whereby the coordinates $\vec{p}_i$ are tracked by an external source (such as a GPS satellite). In such cases, the coordinates $\vec{p}_i$ of each position 30 can be provided by the GPS as global coordinates that are expressed in relation to a fixed point on the Earth. The position of the object 50 that is determined using global coordinates $\vec{p}_i$ of each position 30 can also be given as global coordinates $\vec{p}_o$ of the object 50. Alternatively, and/or additionally, the coordinates $\vec{p}_i$ of each position 30 can be obtained using an inertial measurement unit (IMU) that is situated aboard the mobile platform 10, which can use accelerometers and/or gyroscopes to track the positions 30 of the mobile platform 10. In such cases, the coordinates $\vec{p}_i$ of each position 30 can be provided by the IMU as relative coordinates that are expressed in relation to a local position (such an initial position of the mobile platform 10, or other suitable reference point). The position of the object 50 that is determined using relative coordinates $\vec{p}_i$ of each position 30 can also be given as relative coordinates $\vec{p}_o$ of the object 50.

In some embodiments, the coordinates $\vec{p}_o$ of the object 50 can be determined using an optimization technique based on the coordinates $\vec{p}_i$ of each position 30 of the mobile platform 10 and the measured distances $d_i$. Various optimization techniques are suitable for the present systems and methods, including but not limited to linear optimization techniques and/or nonlinear optimization techniques. Additional optimization techniques that are suitable for the present systems and methods include, for example, least square optimization, Kalman filter, combinatorial optimization, stochastic optimization, linear programming, nonlinear programming, dynamic programming, gradient descent, genetic algorithms, hill climbing, simulated annealing, and the like.

In some embodiments, the object 50 can be a stationary object (for example, a building). Accordingly, the coordinates $\vec{p}_o$ of the object 50 can remain fixed as the distances $d_i$ are measured at each of the positions 30 of the mobile platform 10. In some embodiments, the object 50 is mobile, but has a fixed position during a time interval during which distances $d_i$ to the object 50 are measured at several positions 30 of the mobile platform 10. For example, a bird near the mobile platform 10 can generally move about, but can remain still for several measurements during a particular time interval, and therefore a position of the bird during that time interval can be found. In still other embodiments, the object 50 is a mobile object but moves slowly relative to the mobile platform 10 (for example, a moving boat). Accordingly, several distances $d_i$ can be measured during a time interval during which the object 50 is approximately stationary relative to the mobile platform 10.

In some embodiments, the measured distances $d_i$ can be filtered to suppress measurement noise. Noise in the measured distances $d_i$ can arise, for example, when the mobile platform 10 detects stray particles in the surroundings of the object 50 being tracked. Noise can further arise from a lack of precision in the sensors 11 (shown in FIG. 1) of the mobile platform 10 (for example, resulting from signal interference, temperature effects, or electrical noise). Furthermore, under certain circumstances, the object 50 does not appear as a point object relative to the mobile platform 10. Instead, signals from the mobile platform 10 can reflect off of the object 50 on different parts of the object 50 and/or at different angles of the object 50. Noise reduction can advantageously remove such sources of variability to yield a crisp position of the object 50. Noise can be suppressed, for example, by modeling noise as a random variable that is additive with signal. In some embodiments, noise in the measured distances $d_i$ is substantially Gaussian noise, which can be suppressed using a Gaussian noise model. In some embodiments, noise can be suppressed using a Kalman filter, as exemplified below with respect to FIG. 5.

Figure 4:
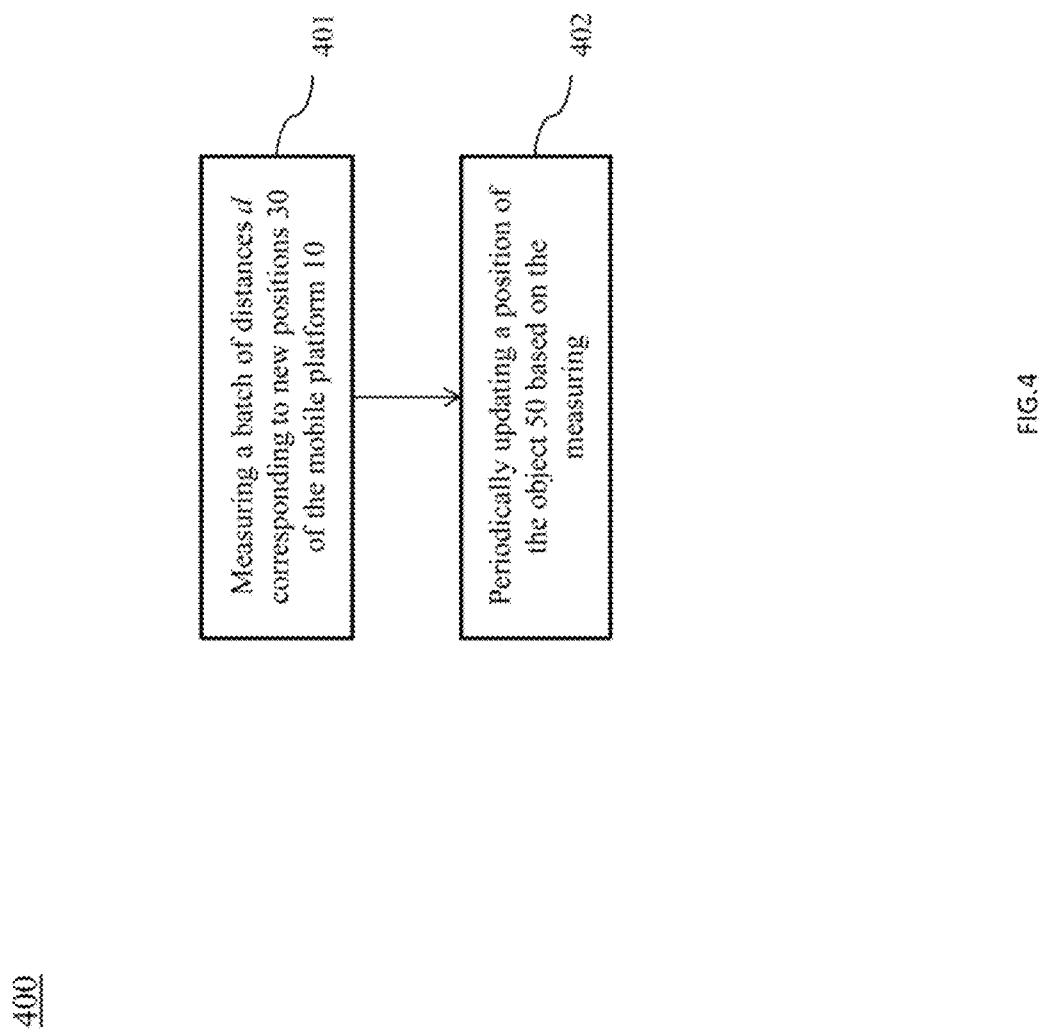
FIG. 4 is an exemplary flow chart illustrating an alternative embodiment of the method of FIG. 3, wherein the position of the object in relation to the mobile platform is periodically updated based on a batch of distance measurements.

In some embodiments, the position of the object 50 can be periodically determined. An exemplary method 400 for periodically determining the position of the object 50 using batched distance measurements is shown in FIG. 4. In the exemplary method 400, the position of the object 50 is periodically updated based on a batch of distance measurements corresponding to new positions 30 of the mobile platform 10. As illustrated in FIG. 4, for example, a batch of distances $d_i$ can be measured, at 401, that correspond to new positions 30 of the mobile platform 10, each position 30 having coordinates $\vec{p}_i$. For example, the distance $d_i$ can be measured by a sensor 11 (shown in FIG. 1) aboard the mobile platform 10. At 402, the position of the object 50 can be periodically updated based on the measured distances $d_i$. For example, a batch of distances $D_i$ can be measured at times t=10 seconds, 20 seconds, and 30 seconds during operation of the mobile platform 10, and a position of the object 50 found based on these distance measurements. Subsequently, an additional batch of distances $d_i$ can be measured at times t=40 seconds, 50 seconds, and 60 seconds during operation of the mobile platform 10, and the position of the object 50 can be updated based on this additional batch of distance measurements. The position of the object 50 can be further dated in similar fashion, as desired. A batch of distance measurements can include, for example, 1, 2, 3, 4, 5, 6, 7, 8, 9, 10, or more distance measurements. In some embodiments, some or all distance measurements used in a previous batch can be used in subsequent batches.

In some embodiments, a least square method can be used to determine and/or update the position of the object 50 based on a plurality of measured distances $d_i$. An exemplary least square method is illustrated as follows with respect to an object 50 having coordinates $\vec{p}_o = (x_0, y_0, z_0)$ and positions 30 of the mobile platform 10 having respective coordinates $\vec{p}_i = (x_i, y_i, z_i)$. The relationship between these coordinates and the measured distances $d_i$ can be represented as in Equation (2) below (shown for i=1 and 2):

$$(x_1-x_0)^2+(y_1-y_0)^2+(z_1-z_0)^2-d_1^2+\lambda((x_2-x_0)^2+(y_2-y_0)^2+(z_2-z_0)^2-d_2^2)=0 \quad \text{Equation (2)}$$

The parameter $\lambda$ can be set to $-1$ to remove quadratic terms, from which Equation (3) can be obtained:

$$2(x_2-x_1)\cdot x_0+2(y_2-y_1)\cdot y_0+2(z_2-z_1)\cdot z_0+(x_1^2-x_2^2)+(y_1^2-y_2^2)+(z_1^2-z_2^2)=(d_1^2-d_2^2) \quad \text{Equation (3)}$$

Equation (3) is a linear equation that can be represented in matrix format as follows:

$$A \cdot \vec{p}_o = B \quad \text{Equation (4)}$$

wherein $$A=[2(x_2-x_1), 2(y_2-y_1), 2(z_2-z_1)], \vec{p}_o=[x_0,y_0,z_0]^T,$$
$$B=[(d_1^2-d_2^2)-(x_1^2-x_2^2)-(y_1^2-y_2^2)-(z_1^2-z_2^2)].$$

Where the number N of positions 30 are measured, and N is greater than three, the matrices A and B can be represented as follows:

$$A = \begin{bmatrix} 2(x_2 - x_1) & 2(y_2 - y_1) & 2(z_2 - z_1) \\ 2(x_3 - x_2) & 2(y_3 - y_2) & 2(z_3 - z_2) \\ \vdots & \vdots & \vdots \\ 2(x_N - x_{N-1}) & 2(y_N - y_{N-1}) & 2(z_N - z_{N-1}) \end{bmatrix} \quad \text{Equation (5)}$$

$$B = \begin{bmatrix} (x_2^2 - x_1^2) + (y_2^2 - y_1^2) + (z_2^2 - z_1^2) - (d_2^2 - d_1^2) \\ (x_3^2 - x_2^2) + (y_3^2 - y_2^2) + (z_3^2 - z_2^2) - (d_3^2 - d_2^2) \\ \vdots \\ (x_N^2 - x_{N-1}^2) + (y_N^2 - y_{N-1}^2) + (z_N^2 - z_{N-1}^2) - (d_N^2 - d_{N-1}^2) \end{bmatrix} \quad \text{Equation (6)}$$

A least square method can be used to find an optimal solution to Equation (4). For example, an objective function for optimization can be set as follows:

$$F(\vec{p}_o) = (B - A\vec{p}_o)^T \cdot (B - A\vec{p}_o) \quad \text{Equation (7)}$$

The objective function can be minimized by taking a derivative of the objective function and setting the derivative to zero, as follows:

$$\frac{\partial F(\vec{p}_o)}{\partial x_i} = -2A_i^T(B - A\vec{p}_o) = 0, i = 1, 2, 3 \quad \text{Equation (8)}$$

wherein $A_i$ represents the ith column of matrix A. Solving yields the following result:

$$\vec{p}_o = (A^T A)^{-1} A^T B \quad \text{Equation (9)}$$

Accordingly, the coordinates $\vec{p}_o = (x_0, y_0, z_0)$ of the object 50 can be obtained based on the matrices A and B, which can include known parameters. The above example is intended to illustrate only one embodiment of a least square method for determining the position of the object 50, and is not meant to be limiting.

Figure 5:
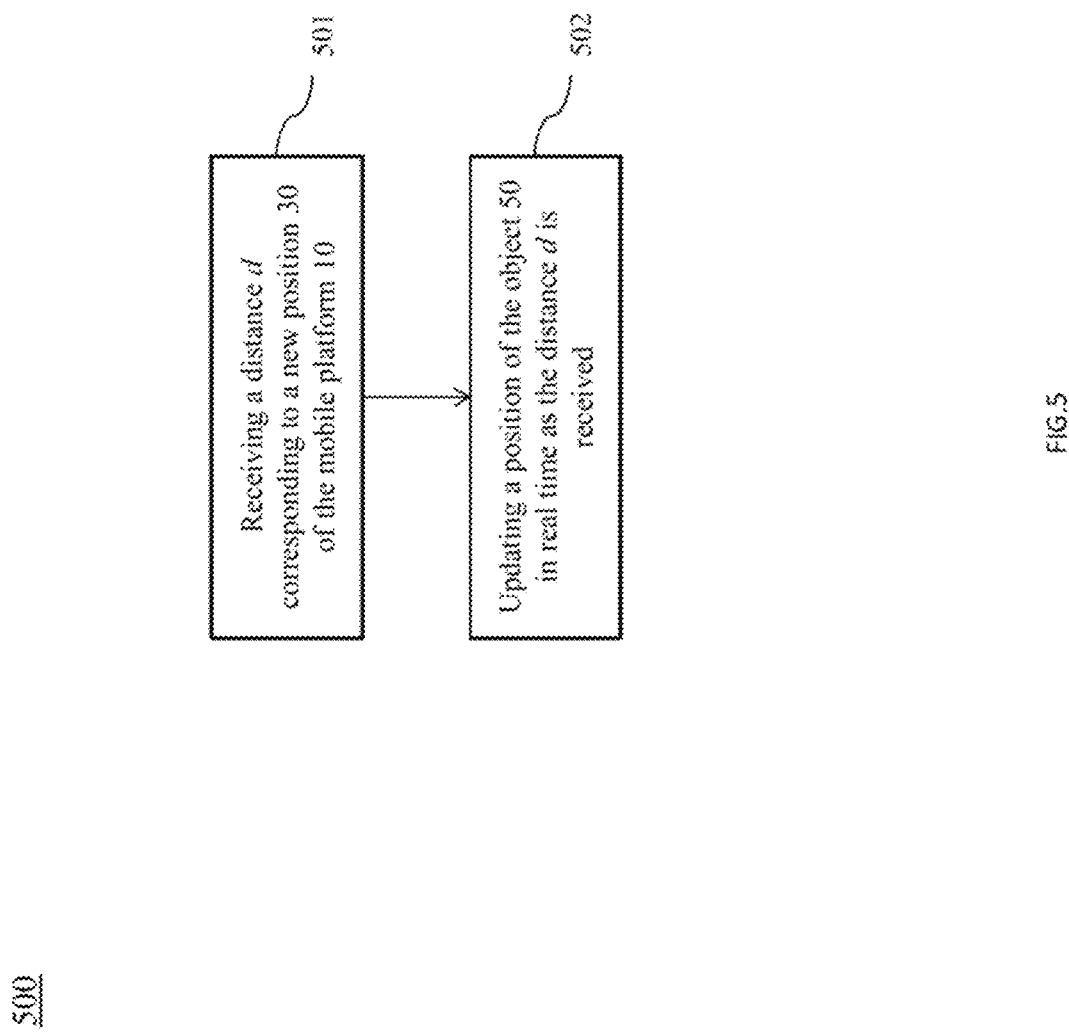
FIG. 5 is an exemplary flow chart illustrating another alternative embodiment of the method of FIG. 3, wherein the position of the object in relation to the mobile platform is updated in real time as each distance measurement is received by the mobile platform.

In some embodiments, the position of the object 50 can be determined in real time. An exemplary method 500 is shown in FIG. 5 for determining the position of the object 50 in real time. In the exemplary method 500, the position of the object 50 is updated in real time as distance measurements corresponding to new positions of the mobile platform are received. Specifically, at 501, a measured distance d is received that corresponds to a new position 30 of the mobile platform 10 at coordinates $\vec{p} = (x, y, z)$. For example, the distance d can be measured by a sensor 11 (shown in FIG. 1) aboard the mobile platform 10. At 502, a position of the object 50 can be updated in real time as the measured distance d is received. For example, the position of the object 50 can be updated between 1 and 2 microseconds, 2 to 5 microseconds, 5 to 10 microseconds, 10 and 20 microseconds, 20 to 50 microseconds, 50 to 100 microseconds, 100 and 200 microseconds, 200 to 500 microseconds, 500 microseconds to 1 millisecond, 1 and 2 milliseconds, 2 to 5 milliseconds, 5 to 10 milliseconds, 10 and 20 milliseconds, 20 to 50 milliseconds, 50 to 100 milliseconds, 100 and 200 milliseconds, 200 to 500 milliseconds, 500 milliseconds to 1 second, 1 and 2 seconds, 2 to 5 seconds, or 5 to 10 seconds after the distance d is measured.

In some embodiments, the position of the object 50 can be determined based a distances d measured at a new position 30 and distances $d_i$ measured at one or more former positions 30 of the mobile platform 10. Stated somewhat differently, the position of the object 50 can be updated based on the new position 30 while taking into account a historical trajectory of the mobile platform 10 relative to the object 50. In some embodiments, the position of the object 50 can be updated using a filtering method. An exemplary filtering method is a Kalman filter, which uses a probabilistic model to estimate parameters of interest based on observed variable that are indirect, inaccurate, and/or uncertain. The Kalman filter is recursive, as the parameters can be updated in real time as new observations are made. The Kalman filter can further model noise (such as Gaussian noise) and thereby suppress that noise in estimating the parameters of interest. The Kalman filter can be used in the present systems and methods for real time determination of the position of the object 50.

An exemplary Kalman filter is illustrated below that includes as a state variable the coordinates $\vec{p}_o$ of the object 50. The exemplary Kalman filter further includes a state variable P that models error of the coordinates $\vec{p}_o$. The Kalman filter is shown as taking place in two steps: a "predict" step and an "update" step. The "predict" and "update" steps can be repeated in multiple iterations (denoted with index k) until an optimal solution for the updated position of the object 50 is attained. For example, the "predict" step can take place as follows:

$$^k\vec{p}_o^- = {}^{k-1}\vec{p}_o \qquad \text{Equation (10)}$$

$$^kP^- = {}^{k-1}P + Q \qquad \text{Equation (11)}$$

wherein $^{k-1}\vec{p}_o$ is an a posteriori state estimate for iteration k−1, $^k\vec{p}_o^-$ is an a priori state estimate for iteration k, $^{k-1}P$ is an a posteriori error estimate for iteration k−1, and $^kP^-$ is an a priori state estimate for iteration k. The variable Q represents noise that is added to the error P at each iteration. Q can be set to various values to model different types of noise. Exemplary values of Q can be, without limitation, 0, 0.1, 0.2, 0.5, 1, 2, 5, 10, 20, 50, 100, or more. In some embodiments, the variable Q can be set to various values without affecting optimization of the position of the object 50. In some embodiments, Q can be set to 1. In other embodiments, Q can be set to 0 (in other words, assuming no noise).

The "update" step of the Kalman filter can take place, for example, as follows. First, a matrix $^kH$ can be found that reflects a change in the state variable from one iteration of the Kalman filter to another. For example, the matrix $^kH$ at state k can be found as:

$$^kH = \frac{\partial}{\partial \vec{p}_o}(|\vec{r}|) = \frac{1}{|\vec{r}|} \cdot \vec{r} \cdot \frac{\partial \vec{r}}{\partial \vec{p}_o} = -\frac{\vec{r}}{|\vec{r}|} = -\frac{\vec{p} - \vec{p}_o}{d} \qquad \text{Equation (12)}$$

wherein $\vec{p}$ represents coordinates of the new position 30 of the mobile platform 10, $\vec{r} = \vec{p} - \vec{p}_o$ represents a displacement between the new position 30 and the position of the object 50, and d represents the distance between the new position 30 and the position of the object 50. A Kalman gain matrix K can be found as follows:

$$^kK = {}^kP^{-k}H({}^kH^{\,k}P^{-k}H^T + R)^{-1} \qquad \text{Equation (13)}$$

wherein R represents sensor noise and can be set to various values depending on particular hardware used. R can be set to, for example, R=1, 2, 3, 4, 5, 6, 7, 8, 9, or 10. The "predict" step can then proceed as follows to obtain a posteriori state and error estimates for iteration k:

$$^k\vec{p}_o = {}^k\vec{p}_o^- + {}^kK(d - {}^kH \cdot {}^k\vec{p}_o^-) \qquad \text{Equation (14)}$$

$$^kp = (I - {}^kK \cdot {}^kH)^kp^- \qquad \text{Equation (15)}$$

wherein $^k\vec{p}_o$ represents an a posteriori state estimate for iteration k, and $^kP$ represents an a posteriori error estimate for iteration k. The "predict" and "update" steps can be repeated as needed to optimize the coordinates $\vec{p}_o$ of the object 50.

The above example is intended to illustrate only one embodiment of a filtering method for determining the coordinates $\vec{p}_o$ of the object 50 and is not meant to be limiting. Furthermore, multiple methods can be used to determine the coordinates $\vec{p}_o$ of the object 50. Using one method (for example, a least square method) does not preclude using another method (for example, a Kalman filter). For example, in some embodiments, both a batch method (shown above with respect to FIG. 4) and a real time method (shown above with respect to FIG. 5) can be used to determine the coordinates $\vec{p}_o$ of the object 50. If different coordinates $\vec{p}_o = (x_0, y_0, z_0)$ of the object 50 are be obtained using the different methods, each of the different coordinates $\vec{p}_o = (x_0, y_0, z_0)$ can be displayed to a user (shown in FIG. 6). Alternatively, and/or additionally, the different coordinates $\vec{p}_o$ can be averaged (for example, using a weighted average), or one set of coordinates discarded for another.

Figure 6:
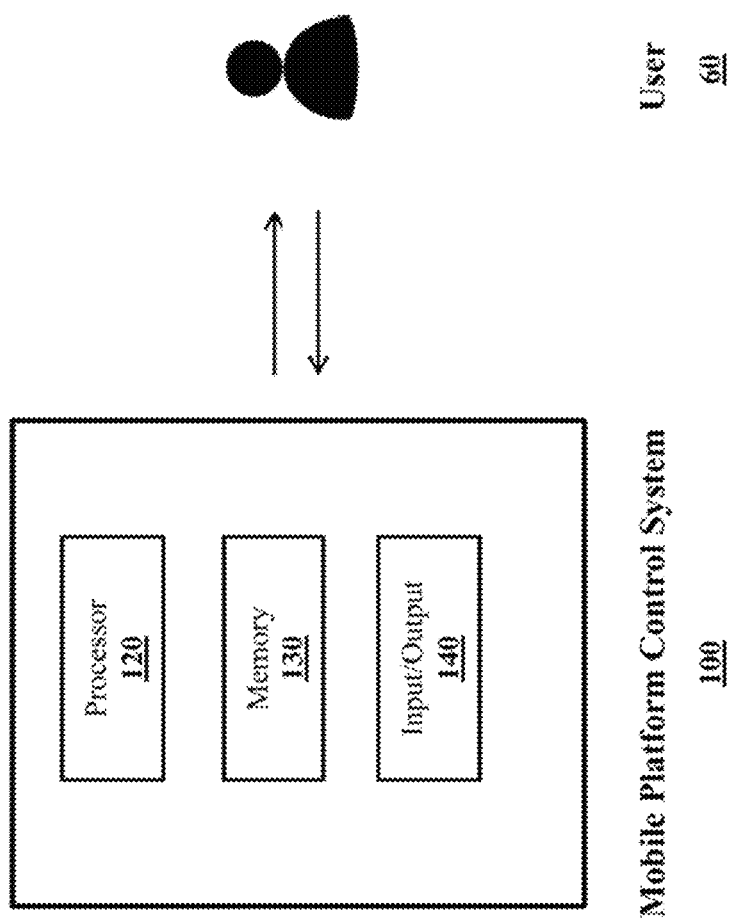
FIG. 6 is an exemplary block diagram illustrating an embodiment of a mobile platform control system for controlling the mobile platform of FIG. 1.

Turning now to FIG. 6, an exemplary mobile platform control system 100 is shown for controlling a mobile platform 10 (shown in FIG. 1). In some embodiments, the mobile platform control system 100 can be mounted aboard the mobile platform 10, as illustrated below with respect to FIG. 9. In some embodiments, the mobile platform control system 100 can be situated on a terminal 200 (shown in FIG. 10) that is distal from the mobile platform 10, as illustrated below with respect to FIG. 9. In some embodiments, some components of the mobile platform control system 100 can be mounted aboard the mobile platform 10, while other components of the mobile platform control system 100 can be situated remotely from the mobile platform 10.

The mobile platform control system 100 can include one or more processors 120. Without limitation, each processor 120 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The processors 120 can be configured to perform any of the methods described herein, including but not limited to, a variety of operations relating to obstacle detection and avoidance. In some embodiments, the processors 120 can include specialized hardware for processing specific operations relating to obstacle detection and avoidance—for example, processing distance data collected from the sensors 11, determining a position of an object 50 (shown in FIG. 1) in an environment of a mobile platform 10 (shown in FIG. 1), and/or controlling the mobile platform 10 based on the determined position.

The mobile platform control system 100 can include one or more additional hardware components (not shown), as desired. Exemplary additional hardware components include, but are not limited to, a memory (or computer readable storage medium) 130, which can include instruction for carrying out any of the methods described herein. Suitable memories 130 include, for example, a random access memory (RAM), static RAM, dynamic RAM, read-only memory (ROM), programmable ROM, erasable programmable ROM, electrically erasable programmable ROM, flash memory, secure digital (SD) card, and the like. The mobile platform control system 100 can further include one or more input/output interfaces (for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces). One or more input/output devices 140 (for example, buttons, a keyboard, keypad, trackball, displays, and a monitor) can also be included in the mobile platform control system 100, as desired.

In some embodiments, one or more components of the mobile platform 10 (for example, a sensor 11 shown in FIG. 1) and/or the mobile platform control system 100 (for example, processor 120, memory 130, and/or input/output 140) described herein can be components of a kit (not shown). The kit can be made for assembling an apparatus (not shown) that can detect object positions in an environment of the mobile platform 10. The components of the kit can be placed in electrical communication with one another, either directly or indirectly, when the apparatus is assembled.

Figure 7:
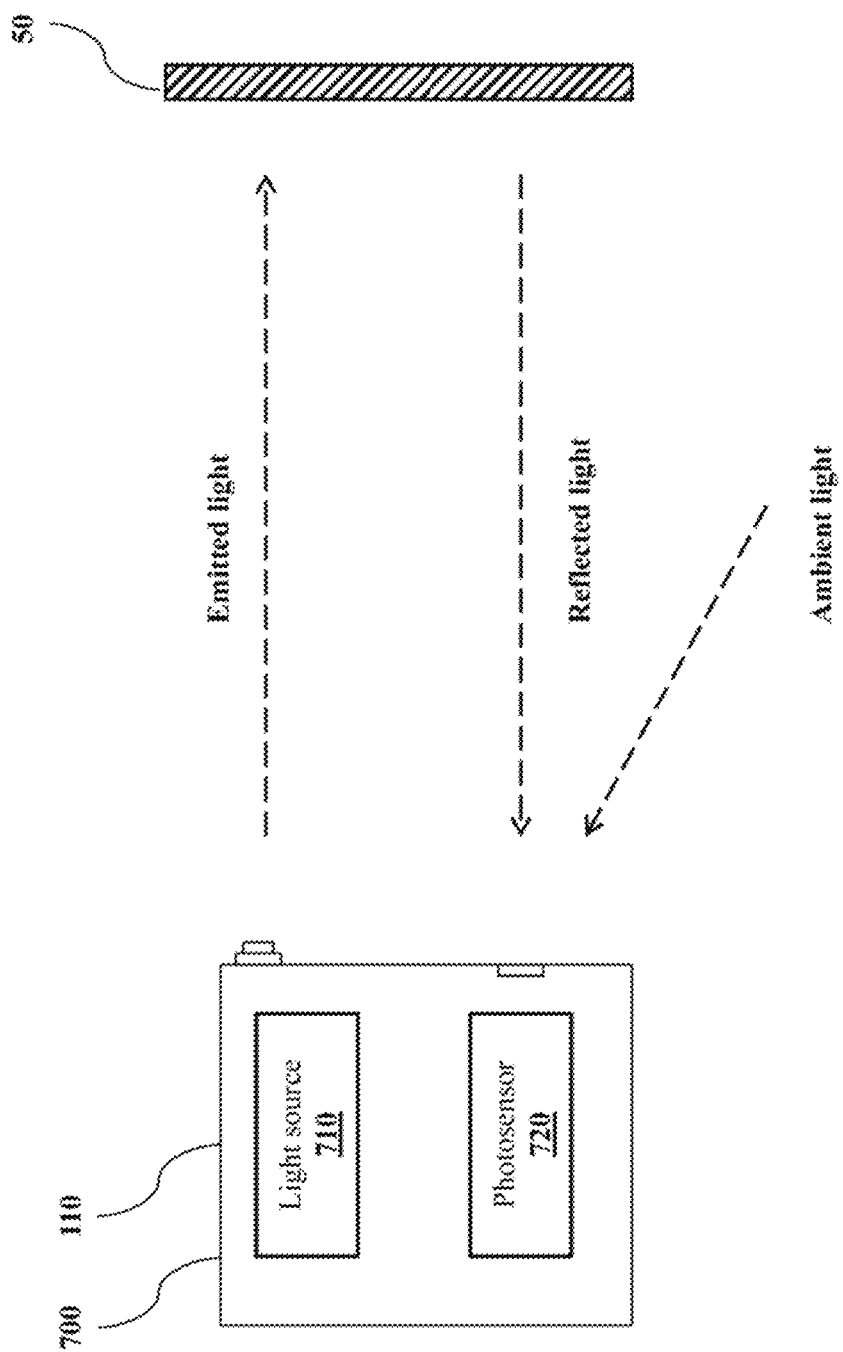
FIG. 7 is an exemplary diagram illustrating an embodiment of a time-of-flight sensor for distance measurement using the mobile platform control system of FIG. 6.

Various methods of distance measurement can be used in the present systems and methods. Although exemplary distance measurement techniques are described below with respect to FIGS. 7 and 8 for illustrative purposes only, any technique for obtaining a distance d between two points can be suitable for the present systems and methods. In some embodiments, the distance d can be measured using time-of-flight sensing. Turning now to FIG. 7, an exemplary sensor 11 is shown as a time-of-flight sensor 700. The time-of-flight sensor 700 can include a light source 710 that can generate light within a predetermined frequency range. In one embodiment, the light source 710 is a solid-state laser or light-emitting diode (LED). In another embodiment, the light source generates illumination in an infrared range. In still another embodiment, the light is in a near infrared range. The light source 710 can emit light as pulsed signals and/or as a continuous wave.

The light can be emitted from the light source 710 and toward an object 50. Light reflected from the object 50 can be detected by the time-of-flight sensor 700 using one or more photosensors 720 that can sense the reflected light and convert the sensed light into electronic signals. Each photosensor 720 of the time-of-flight sensor 700 can be, for example, a charge-coupled device (CCD), a complementary metal-oxide-semiconductor (CMOS), an N-type metal-oxide-semiconductor (NMOS) imaging devices, and hybrids/variants thereof. The photosensors can be arranged in a two-dimensional array (not shown) that can each capture one pixel of image information, collectively enabling construction of an image depth map (not shown). In some embodiments, the time-of-flight sensor 700 has a quarter video graphics array (QVGA) or higher resolution—for example, a resolution of at least 0.05 Megapixels, 0.1 Megapixels, 0.5 Megapixels, 1 Megapixel, 2 Megapixels, 5 Megapixels, 10 Megapixels, 20 Megapixels, 50 Megapixels, 100 Megapixels, or an even greater number of pixels. The time-of-flight sensor 700 can advantageously be configured to differentiate between reflected light (signal) and ambient light (noise). Once the reflected light is sensed, the distance d to the object 50 can be measured according to the time-of-flight of the light signal (for example, using a phase-shift method).

Figure 8:
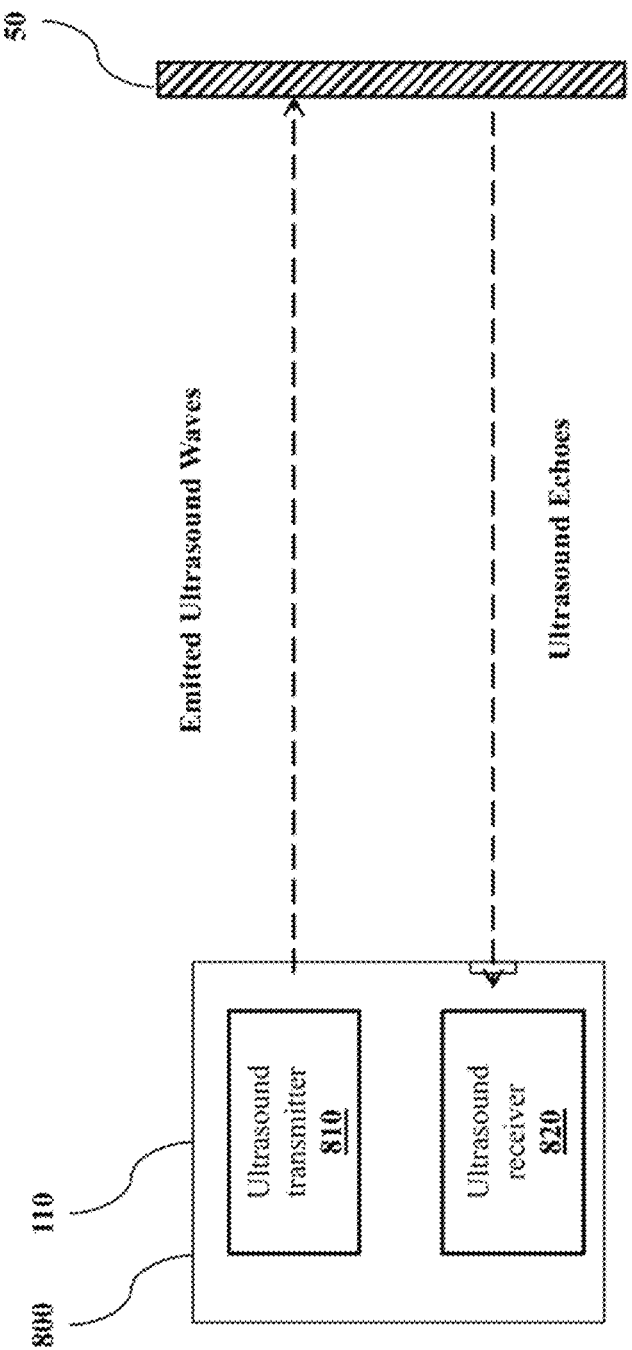
FIG. 8 is an exemplary diagram illustrating an embodiment of an ultrasound sensor for distance measurement using the mobile platform control system of FIG. 6.

In some embodiments, the distance d can be measured using ultrasound. Turning now to FIG. 8, an exemplary sensor 11 is shown as an ultrasound sensor 800. The ultrasound sensor 800 can emit ultrasound waves at high frequency and evaluate an ultrasound echo, which is received back after reflection by the object 50. Based on time lapse between sending the ultrasound signal and receiving the echo, the distance d to the object 50 can be determined. The ultrasound sensor 800 can include an ultrasound transmitter 810 and at least one ultrasound receiver 820. The ultrasound transmitter 810 and/or the ultrasound receiver 820 can each be an ultrasound transducer that converts electrical signals into ultrasound waves and vice versa. Exemplary ultrasound transducers include piezoelectric transducers and capacitive transducers. In some embodiments, the ultrasound sensor 800 can include an arrayed ultrasound transducer in a one-dimensional or two-dimensional configuration.

In some embodiments, multiple sensors 11 and/or multiple types of sensors 11 can be used to determine a distance d to an object 50. Individual sensing techniques can have drawbacks that are compensated for by other sensing techniques. For example, ultrasound can typically have limited detection range (commonly less than five meters) and limited sensitivity to small objects. Time-of-flight sensing has longer range but may be limited by interference from strong ambient lighting. Accordingly, ultrasound and time-of-flight sensing can advantageously be used in conjunction to determine the distance d. In some embodiments, the sensors 11 can be physically discrete devices for easy of replacement and modularity. In other embodiments, the sensors 11 can be integrated partially or fully into a single device, and share overlapping physical components such as housing, microchips, photosensors, detectors, communications ports, and the like.

Figure 9:
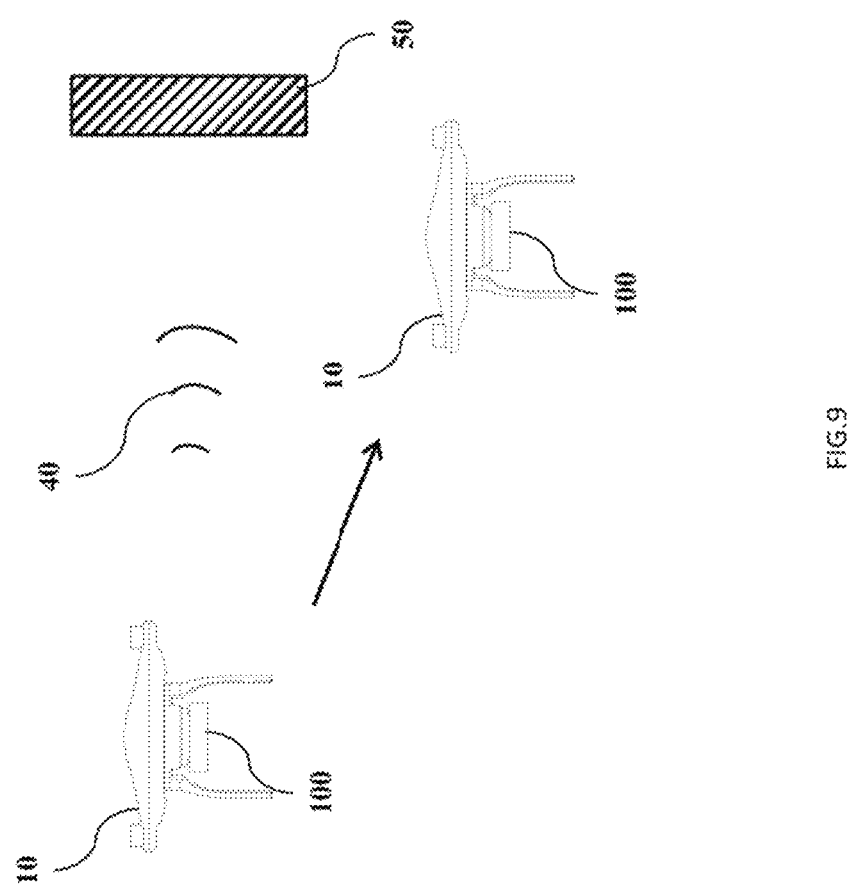
FIG. 9 is an exemplary diagram illustrating an alternative embodiment of the mobile platform control system of FIG. 6, wherein the mobile platform control system is mounted aboard the mobile platform.

The mobile platform control system 100 can be situated relative to the mobile platform 10 in any convenient fashion. In some embodiments, the mobile platform control system 100 can be mounted aboard the mobile platform 10 as illustrated in FIG. 9. Since the mobile platform control system 100 is physically proximate to the mobile platform 10, one or more components of the mobile platform control system 100 can advantageously be hardwired to the mobile platform 10, reducing delays due to remote communications. For example, a processor 120 (shown in FIG. 6) of the mobile platform control system 100 can be configured to directly receive signals from the sensor(s) 11, as well as directly transmit control signals to the mobile platform 10 to avoid detected objects 50.

In some embodiments, the mobile platform control system 100 can be configured to autonomously control the mobile platform 10 to avoid the object 50 during travel or other operations. As shown in FIG. 9, for example, the mobile platform 10 can emit signals 40 to sense the presence of an object 50 blocking the path of the mobile platform 10. The position of the object 50 can be determined and transmitted to the mobile platform control system 100. The processor 120 can accordingly determine an alternative trajectory for the mobile platform 10 that avoids collision with the object 50. The processor 120 can relay instructions to the mobile platform 10 to alter the flight of the mobile platform 10 according to the alternative trajectory. Although autonomous control of the mobile platform 10 for object avoidance is described with respect to a mounted mobile platform control system 100 for illustrative purposes only, autonomous control of the mobile platform 10 can be used in any configuration of the mobile platform control system 100.

Figure 10:
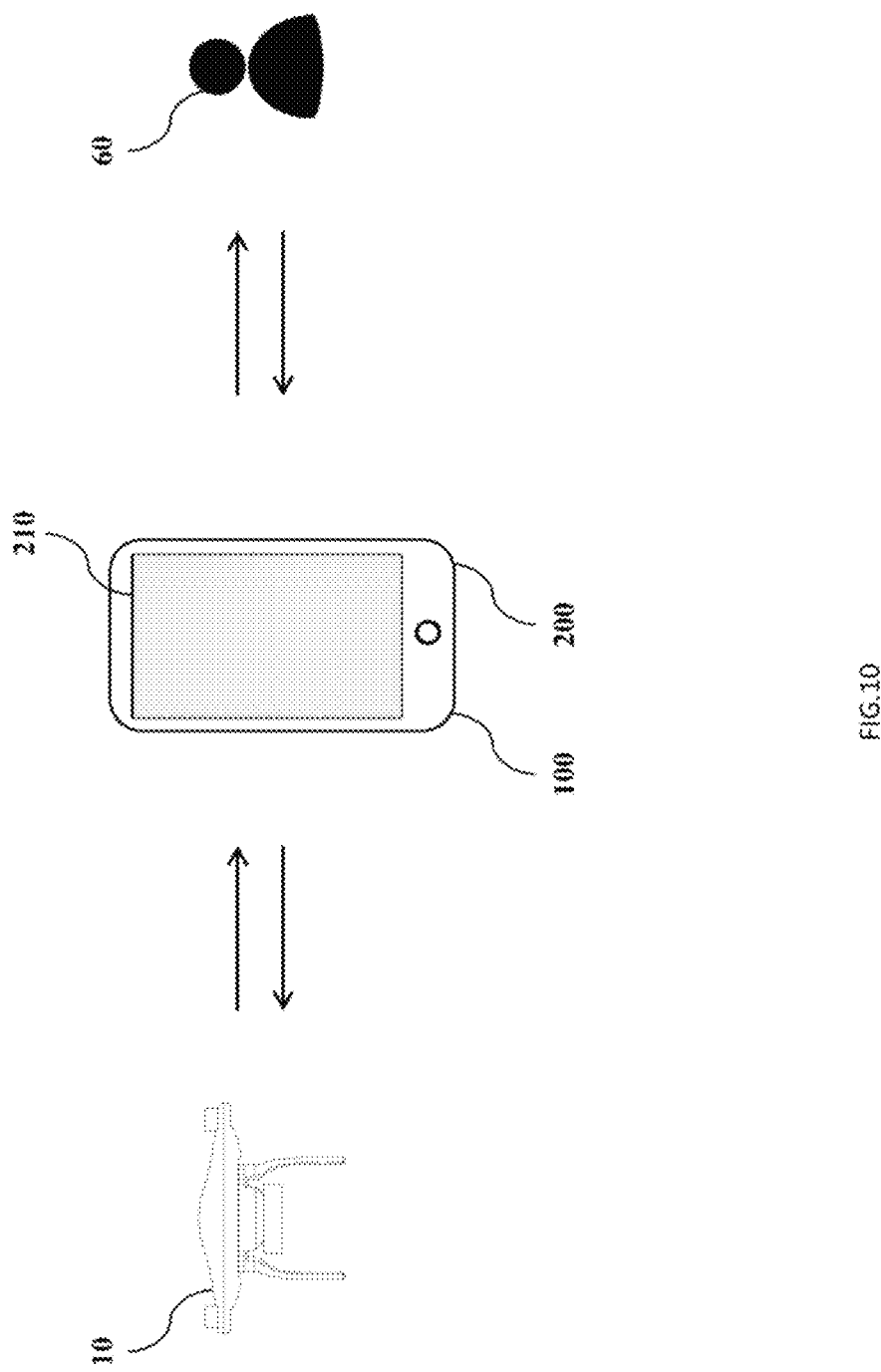
FIG. 10 is an exemplary diagram illustrating another alternative embodiment of the mobile platform control system of FIG. 6, wherein the mobile platform control system is situated on a terminal that is distal from the mobile platform.

Turning now to FIG. 10, an embodiment is shown in which a user 60 interacts with a mobile platform control system 100 that is situated on a terminal 200. The terminal 200 can be a remote terminal that is distal from the mobile platform 10. Exemplary terminals 200 include, without limitation, application-specific devices such as remote controllers, as well as general-purpose devices such portable computers, laptops, mobile devices, handheld devices, mobile telephones (for example, smartphones), tablet devices, tablet computers, personal digital assistants, handheld consoles, portable media players, wearable devices (for example, smartwatches and head-mounted displays), and the like. Various wireless communication methods can be used for remote communication between the mobile platform 10 and the terminal 200. Suitable communication methods include, for example, radio, Wireless Fidelity (Wi-Fi), cellular, satellite, and broadcasting.

As shown in FIG. 10, the terminal 200 can include a user interface 210 for interacting with the user 60 to control the mobile platform 10. The terminal 200 can further display elements of the user interface 210 such as windows, buttons, menus, icons, pop-ups, tabs, controls, cursors, insertion points, and the like. In some embodiments, the user interface 210 can be provided at least in part via application software (colloquially known as an "app") installed on the terminal 200. For example, where the terminal 200 is a mobile device, the app can be made available and kept updated by a vendor through a mobile app store. Through the app, the vendor can provide any functionality that is useful for a user to remotely monitor the mobile platform 10 and nearby objects 50, and/or control the mobile platform 10 to avoid the objects 50. For example, in some embodiments, the app can be configured to display a realistic depiction of an environment of the mobile platform 10, including distances d between the mobile platform 10 and nearby objects 50. If the mobile platform 10 is in danger of collision with an object 50, an appropriate warning signal (such as flashing lights, red text, vibrations, and/or warning sounds) can be transmitted to the user 60 through the user interface 210. The user 60 can thereby control the mobile platform 10 through the terminal 200 to avoid the object 10. In some embodiments, as a failsafe feature, the terminal 200 can be configured to autonomously send a signal to the mobile platform 10 in an effort to avoid the object 50.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method of controlling a mobile platform comprising:
   measuring, by at least two distance sensors, a distance between the mobile platform and an object when the mobile platform is located at each of a plurality of positions to obtain a plurality of measured distances each being obtained at one of the plurality of positions, location information of the plurality of positions of the mobile platform being obtained by an inertial measurement unit (IMU) on the mobile platform, and the at least two distance sensors being configured to capture data from different directions;
   determining a position of the object based on the plurality of measured distances and the location information; and
   controlling the mobile platform to avoid the object based on the results of the determined position of the object.

2. The method of claim 1, wherein the at least two distance sensors include a distance sensor of a first sensor type and a distance sensor of a second sensor type, the first sensor type being different from the second sensor type.

3. The method of claim 1, wherein determining the position of the object includes:
   in response to determining that a measured distance of the plurality of measured distances produces a degenerated solution of the position of the object, excluding the measured distance from the plurality of measured distances.

4. The method of claim 1, wherein the plurality of positions are non-collinear.

5. The method of claim 1, wherein the plurality of positions are along a trajectory of the mobile platform.

6. The method of claim 1, wherein the at least two distance sensors include two or more of a time-of-flight (TOF) sensor, a laser sensor, an ultrasound sensor, a color or monochrome sensor, an electro-optical sensor, a thermal/infrared sensor, a multi-spectral imaging sensor, a spectrophotometer, a spectrometer, a thermometer, an illuminometer, and a microphone.

7. The method of claim 1, wherein determining the position of the object includes determining the position of the object using a filtering method.

8. The method of claim 1, wherein determining the position of the object includes determining the position of the object using an optimization technique.

9. The method of claim 1, wherein determining the position of the object includes obtaining relative coordinates of the positions of the mobile platform.

10. The method of claim 1, wherein determining the position of the object includes obtaining global coordinates of the positions of the mobile platform.

11. A mobile platform comprising:
    an inertial measurement unit (IMU) configured to obtain location information of a plurality of positions when the mobile platform is located at each of the plurality of positions;
    at least two distance sensors configured to, by capturing data from different directions, measure a distance between the mobile platform and an object when the mobile platform is located at each of the plurality of positions to obtain a plurality of measured distances each being obtained at one of the plurality of positions; and
    one or more processors configured to determine a position of the object based on the plurality of measured distances and the location information and to control the mobile platform to avoid the object based on the determined position of the object.

12. The mobile platform of claim 11, wherein the at least two distance sensors include a distance sensor of a first sensor type and a distance sensor of a second sensor type, the first sensor type being different from the second sensor type.

13. The mobile platform of claim 11, wherein the one or more processors are further configured to, in response to determining that a measured distance of the plurality of measured distances produces a degenerated solution of the position of the object, exclude the measured distance from the plurality of measured distances.

14. The mobile platform of claim 11, wherein the plurality of positions are non-collinear.

15. The mobile platform of claim 11, wherein the plurality of positions are along a trajectory of the mobile platform.

16. The mobile platform of claim 11, wherein the at least two distance sensors include two or more of a time-of-flight (TOF) sensor, a laser sensor, an ultrasound sensor, a color or monochrome sensor, an electro-optical sensor, a thermal/infrared sensor, a multi-spectral imaging sensor, a spectrophotometer, a spectrometer, a thermometer, an illuminometer, and a microphone.

17. The mobile platform of claim 11, wherein the one or more processors are further configured to determine the position of the object using a filtering method.

18. The mobile platform of claim 11, wherein the one or more processors are further configured to determine the position of the object using an optimization technique.

19. The mobile platform of claim 11, wherein the one or more processors are further configured to determine the position of the object using relative coordinates of the positions of the mobile platform.

20. The mobile platform of claim 11, wherein the one or more processors are further configured to determine the position of the object using global coordinates of the positions of the mobile platform.

* * * * *